(12) United States Patent
Oyama

(10) Patent No.: US 8,779,738 B2
(45) Date of Patent: Jul. 15, 2014

(54) CONTROL CIRCUIT FOR SWITCHING REGULATOR, SWITCHING REGULATOR AND ELECTRONIC EQUIPMENT USING THE CONTROL CIRCUIT

(75) Inventor: Manabu Oyama, Kyoto (JP)

(73) Assignee: Rohm Co., Ltd. (JP)

( * ) Notice: Subject to any disclaimer, the term of this patent is extended or adjusted under 35 U.S.C. 154(b) by 373 days.

(21) Appl. No.: 13/314,728

(22) Filed: Dec. 8, 2011

(65) Prior Publication Data

US 2012/0146605 A1    Jun. 14, 2012

(30) Foreign Application Priority Data

Dec. 10, 2010    (JP) ................................. 2010-275998

(51) Int. Cl.
*G05F 1/575* (2006.01)

(52) U.S. Cl.
USPC .......................................... 323/282; 323/272

(58) Field of Classification Search
CPC ... H02M 3/156; H02M 3/158; H02M 3/1588; G05F 1/10; G05F 1/468; G05F 1/575
USPC .................................................. 323/271, 282
See application file for complete search history.

(56) References Cited

U.S. PATENT DOCUMENTS

| | | | | |
|---|---|---|---|---|
| 5,514,947 | A * | 5/1996 | Berg | 323/282 |
| 2008/0067989 | A1* | 3/2008 | Kasai et al. | 323/271 |
| 2010/0026262 | A1* | 2/2010 | Sase et al. | 323/283 |
| 2012/0105031 | A1* | 5/2012 | Kumagai | 323/271 |
| 2012/0146605 | A1* | 6/2012 | Oyama | 323/282 |
| 2013/0229160 | A1* | 9/2013 | Saito et al. | 323/271 |
| 2014/0049237 | A1* | 2/2014 | Hara et al. | 323/271 |

* cited by examiner

*Primary Examiner* — Jeffrey Sterrett
(74) *Attorney, Agent, or Firm* — Cantor Colburn LLP

(57) ABSTRACT

The invention improves the voltage regulation rate of the switching regulator in lag control. A divided output voltage divided by the first resistor and the second resistor is input to a first polarity input terminal of a comparator. A driver is used for controlling a switching transistor and a synchronous rectified transistor according to an output pulse of the comparator. A feedback circuit is used for outputting a switching signal to the reverse input terminal of the comparator according to the output pulse, wherein the switching signal is used for switching two voltage levels between the input voltage and a ground voltage. The error amplifier is used for amplifying an error between the divided output voltage and a first reference voltage and generating a second reference voltage to output to a second polarity input terminal of the comparator.

10 Claims, 7 Drawing Sheets

CONTROL CIRCUIT FOR SWITCHING REGULATOR, SWITCHING REGULATOR AND ELECTRONIC EQUIPMENT USING THE CONTROL CIRCUIT

BACKGROUND OF THE INVENTION

1. Field of the Invention

The present invention relates to a switching regulator.

2. Description of the Related Art

Power requirements of portable electronic devices such as mobile phones and Personal Digital Assistants (PDAs) are sometimes higher or lower in terms of voltage than that supplied by the battery. In order to supply a proper voltage, a buck or boost-buck switching regulator (DC/DC converter) is commonly employed.

Lag control has come to replace pulse width modulation and pulse frequency modulation control method employed by the switching element of a switching regulator. FIG. 1 shows a circuit diagram of a buck switching regulator using lag control. A switching regulator 1004 includes switching transistors M1, M2 (M2 is also called as synchronous rectified transistor), inductor L1, output capacitor C1 and control circuit 1100.

The resistors R1, R2 are used to divide the output voltage $V_{OUT}$. The divided output voltage $V_{OUT}'$ is input to a reverse input terminal (−) of a lag comparator 22. The lag comparator 22 is used to compare the voltage $V_{FB}$ of the reverse input terminal with reference voltage $V_{REF}$ of the non-reverse input terminal, and to generate a pulse signal S1 representing a compared result. According to the pulse signal S1, a driver 20 is used to switch the switching transistor M1 and the synchronous rectified transistor M2 using complementary method. A switching voltage $V_{LX}$ of a connecting point connecting the switching transistor M1 and the synchronous rectified transistor M2 feeds back to the reverse input terminal of the lag comparator 22 through a feedback circuit 24 having a feedback resistor $R_{FB}$ and a feedback capacitor $C_{FB}$. That is, the feedback voltage $V_{FB}$ of the reverse input terminal of the lag comparator 22 overlaps a DC component $V_{OUT}'$ of output voltage $V_{OUT}$ and the switching voltage $V_{LX}$.

SUMMARY OF THE INVENTION

FIGS. 2(a)-2(c) show waveforms of the operation of the switching regulator 1004 in FIG. 1. FIG. 2(a) shows the input voltage $V_{IN}$ at a normal voltage level condition. FIG. 2(b) shows the input voltage $V_{IN}$ at an under voltage level condition being lower than a normal voltage level. FIG. 2(c) shows the input voltage $V_{IN}$ at an over voltage level condition being higher than a normal voltage level.

The switching voltage $V_{LX}$ of a connecting point connecting the switching transistor M1 and the synchronous rectified transistor M2 floats between the input voltage $Y_{IN}$ and the ground voltage (0V). That is, the amplitude of the switching voltage $V_{LX}$ varies according to the input voltage $V_{IN}$. Therefore, the amplitude of the feedback voltage $V_{FB}$ overlapping the switching voltage $V_{LX}$ varies according to the input voltage $V_{IN}$. As a result, the relation between the feedback voltage $V_{FB}$ and the reference voltage $V_{REF}$ varies according to the level of the input voltage $V_{IN}$. Because of the change of the relation, the level of the output voltage $V_{OUT}$ shifts. That is, the voltage regulation rate of the switching regulator in the lag control is poor.

It is an objective of the present invention to improve the voltage regulation rate of the switching regulator in the lag control.

One type of control circuit of the invention relates to a control circuit for controlling at least one switching transistor of a switching regulator receiving an input voltage and generating an output voltage. The control circuit includes: a first resistor and a second resistor for dividing the output voltage of the switching regulator; a comparator having a first polarity input terminal input a divided output voltage divided by the first resistor and the second resistor; a driver for controlling the switching transistor according to an output pulse of the comparator; a feedback circuit for outputting a switching signal to the first polarity input terminal of the comparator according to the output pulse, the switching signal for switching two voltage levels between the input voltage and a fixed voltage; and an error amplifier for amplifying an error between the divided output voltage divided by the first resistor and the second resistor and a first reference voltage and generating a second reference voltage to output to a second polarity input terminal of the comparator.

In the type of control circuit described above, in addition to the conventional feedback circuit of the lag control, a second feedback circuit is used to input the second reference voltage to the comparator in a control manner to have the output voltage of the switching regulator and the voltage level of the first reference voltage be identical so that the variation of the output voltage due to the variation of the input voltage can be restrained. Furthermore, by using the second feedback circuit, the variation of the output voltage due to the variation of the load can be enhanced.

Another type of control circuit of the invention relates to a control circuit for controlling at least one switching transistor of a switching regulator receiving an input voltage and generating an output voltage. The control circuit comprises: a first resistor and a second resistor for dividing the output voltage of the switching regulator; a comparator having a first input terminal input a divided output voltage divided by the first resistor and the second resistor; a voltage source for generating a reference voltage to be input to a second input terminal of the comparator, wherein the reference voltage can be reduced when the input voltage increases; a driver for controlling the switching transistor according to an output pulse of the comparator; and a feedback circuit for outputting a switching signal to the first input terminal of the comparator according to the output pulse, the switching signal for switching two voltage levels between the input voltage and a fixed voltage.

In the type of control circuit described above, the feedforward control according to the input voltage is used to adjust the reference voltage input to the comparator so that the variation of the output voltage due to the variation of the input voltage can be restrained.

Another embodiment of the invention is a switching regulator. The switching regulator comprises any type of the above control circuits.

Another embodiment of the invention is an electronic equipment comprising the switching regulator.

The invention allows the voltage regulation rate of the switching regulator in the lag control to be improved.

PREFERRED EMBODIMENTS OF THE PRESENT INVENTION

Figure 1:
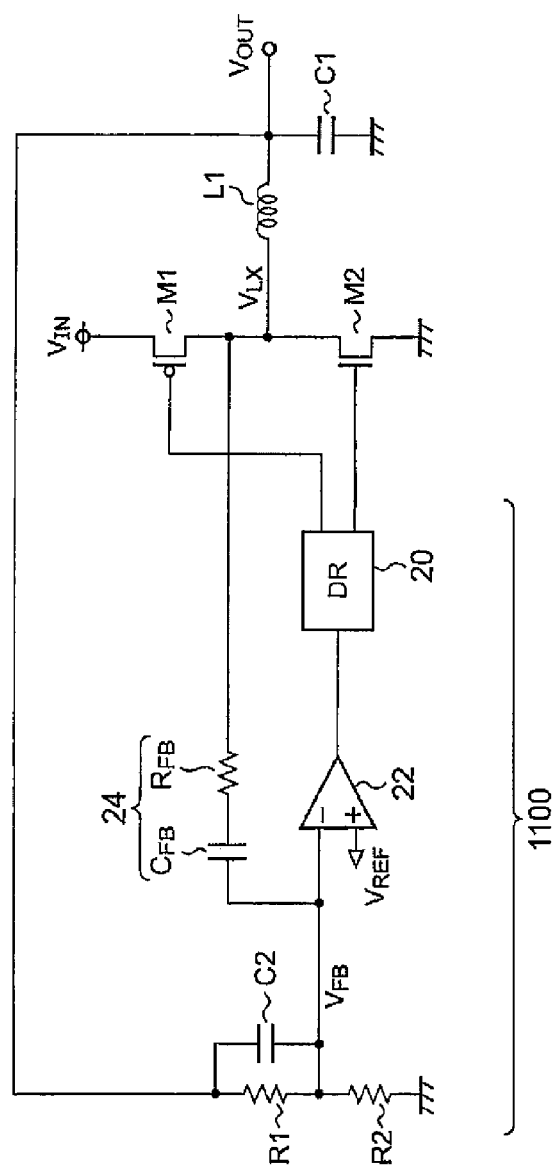
FIG. 1 shows a circuit diagram of a buck switching regulator using lag control method.
Figure 2:
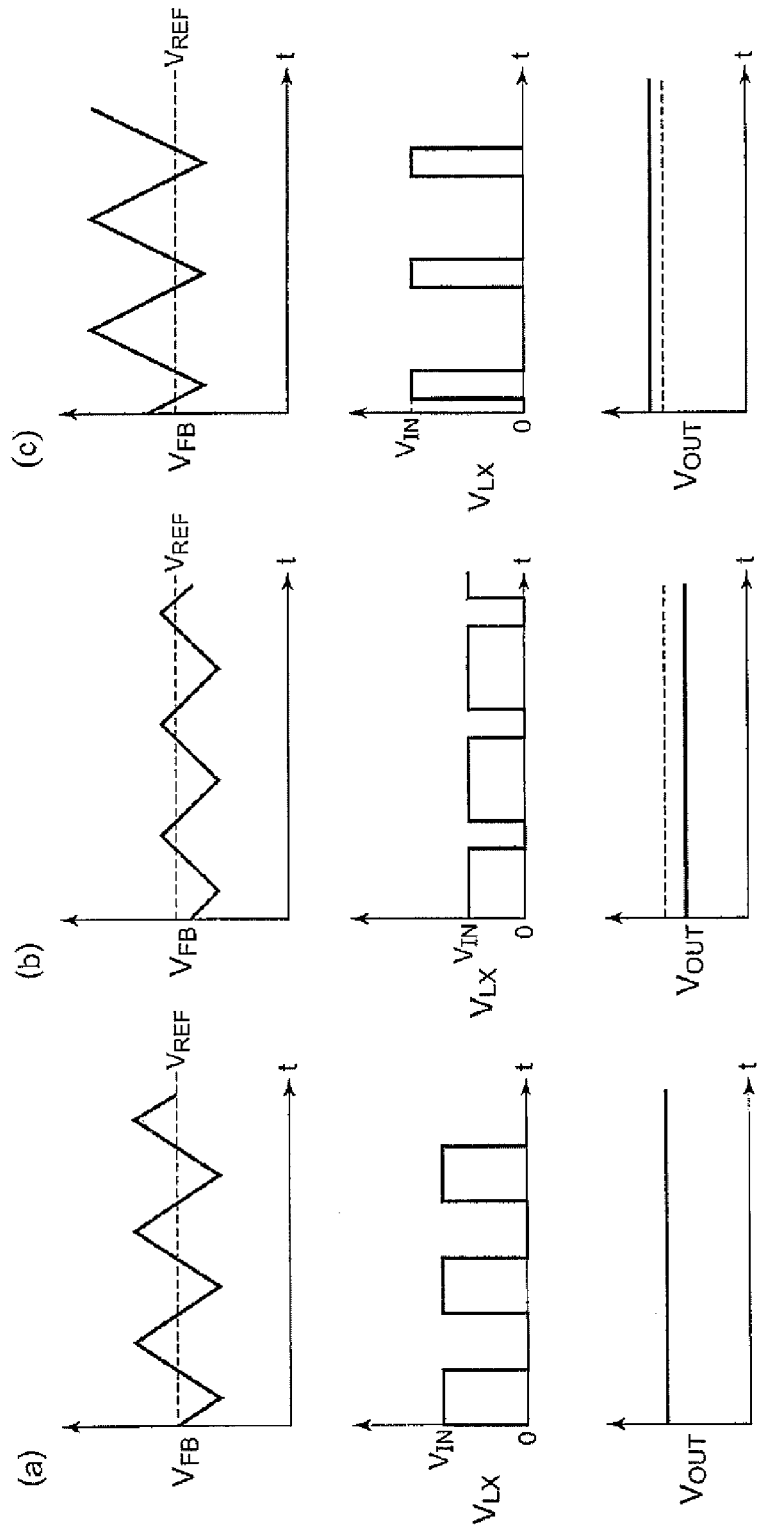
FIGS. 2(a)-2(c) show waveforms of the operation of the switching regulator in FIG. 1.

Common reference numerals are used throughout the drawings and the detailed description to indicate the same components. The present invention will be more apparent from the following detailed description taken in conjunction with the accompanying drawings.

In the following detailed description, for purposes of explanation, numerous specific details are set forth in order to provide a thorough understanding of the disclosed embodiments. It will be apparent, however, that one or more embodiments may be practiced without these specific to details.

In the specification, the connection of element A and element B means physically direct connection of element A and element B, and also means indirect connection of element A and element B by the other element without influencing in the electrical connection.

Similarly, element C mounted between element A and element B means direct connection of element A and element C or direct connection of element B and element C, and also means indirect connection by the other element without influencing in the electrical connection.

First Embodiment

Figure 3:
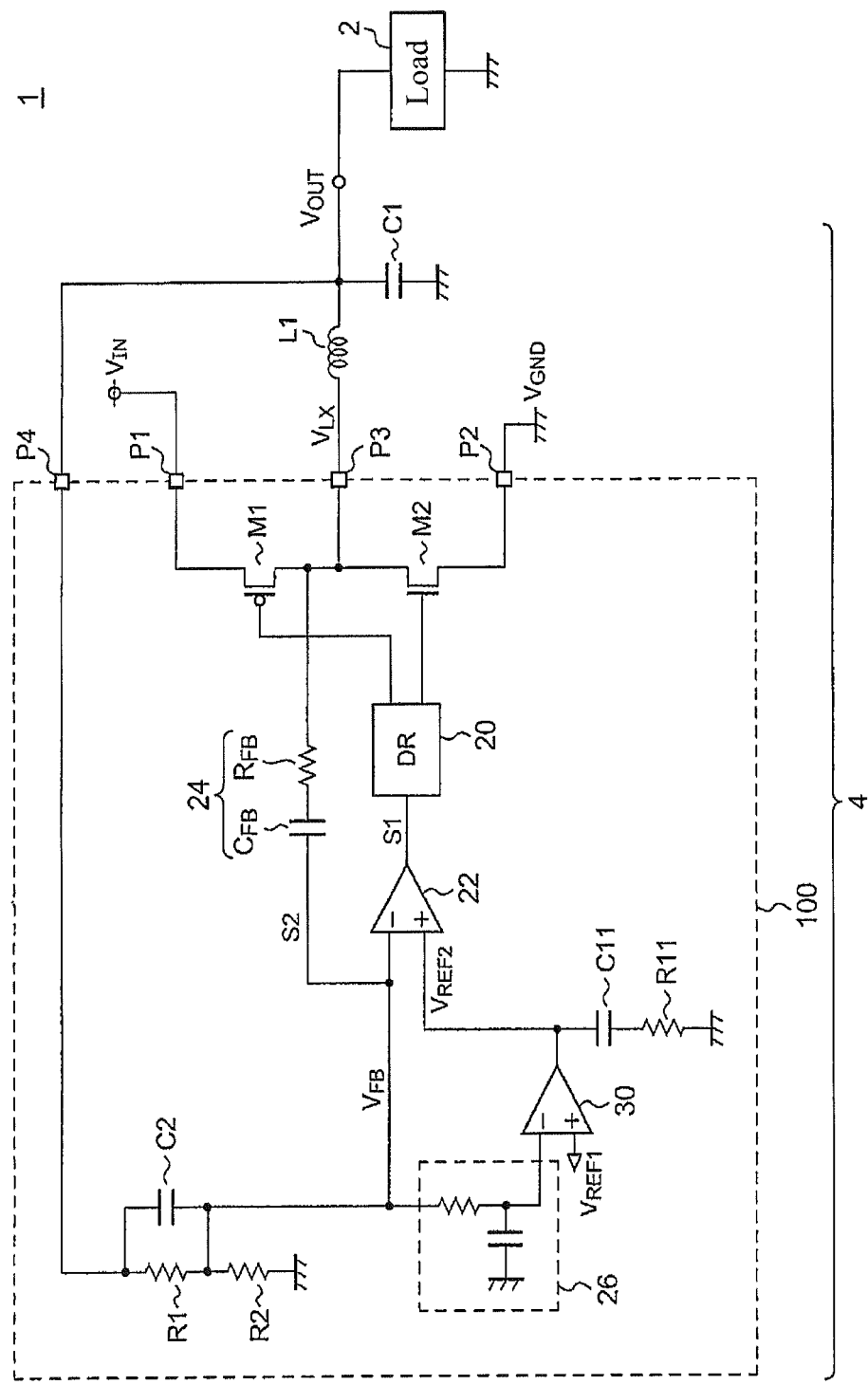
FIG. 3 shows a circuit diagram of an electronic equipment having switching regulator according to a first embodiment.

FIG. 3 shows a circuit diagram of an electronic equipment having switching regulator (power supply device) 4 according to a first embodiment. The electronic equipment 1, for example mobile phone, digital camera, digital video camera, or Personal Digital Assistant (PDA), is a battery driven type of device. The electronic equipment includes a switching regulator 4 and a load 2. The switching regulator 4 is a buck switching regulator that receives a DC input voltage $V_{IN}$ from a battery or power adaptor (not shown) and generates an output voltage $V_{OUT}$ by reducing the input voltage $V_{IN}$ to provide to the load 2. The load 2, for example, Digital Signal Processor (DSP), liquid crystal driver, or audio circuit, is an electronic circuit, though not limited thereto.

The switching regulator 4 includes a control circuit 100, an inductor L1 and an output capacitor C1. The control circuit 100 includes a switching transistor M1 and a synchronous rectified transistor M2, but the switching transistor M1 and the synchronous rectified transistor M2 can be mounted outside the control circuit 100.

The topology of output circuit including the switching transistor M1, the synchronous rectified transistor M2, the inductor L1 and the output capacitor C1 is the same as the common synchronous rectified type switching regulator.

The control circuit 100 includes a power supply terminal P1, a ground terminal P2, a switch terminal P3 and a feedback terminal P4. The input voltage $V_{IN}$ is input to the power supply terminal P1, and the ground voltage $V_{GND}$ is provided to ground terminal P2. The switch terminal P3 is is used to output a voltage $V_{LX}$ of a connecting point LX connecting the switching transistor M1 and the synchronous rectified transistor M2 to the inductor L1. The output voltage $V_{OUT}$ is input to the feedback terminal P4.

In addition to the switching transistor M1 and the synchronous rectified transistor M2, the control circuit 100 includes a first resistor R1, a second resistor R2, a driver 20, a comparator 22, a feedback circuit 24 and error amplifier 30.

The first resistor R1 and the second resistor R2 connect in series and are mounted between the feedback terminal P4 and a ground terminal to divide the output voltage $V_{OUT}$. A capacitor C2 and the first resistor R1 connect in parallel to compensate for phase. The divided output voltage $V_{OUT}'$ is input to a first polarity input terminal (−) of the comparator 22. The comparator 22 is used to compare the voltage of the first polarity input terminal (−, also is known as reverse input terminal) with the voltage of the second polarity input terminal (+, also known as non-reverse input terminal), and to generate a pulse signal S1 representing a compared result.

According to the pulse signal S1, the driver 20 is used to switch ON/OFF the switching transistor M1 and the synchronous rectified transistor M2 using a complementary method. The driver 20 can utilize conventional techniques.

The feedback circuit 24 is used for outputting a switching signal S2 overlapping the reverse input terminal (−) of the comparator 22 according to the output pulse S1; the logic of the switching signal is substantially the reverse logic of output pulse S1. The switching signal S2 floats between the input voltage $V_{IN}$ and the ground voltage $V_{GND}$. For example, the feedback circuit 24 includes capacitor $C_{FB}$ and resistor $R_{FB}$ connected in series and mounted between the switch terminal P3 and the reverse input terminal (−) of the comparator 22. The feedback voltage $V_{FB}$ of the reverse input terminal of the comparator 22 overlaps the divided output voltage $V_{OUT}'$ of output voltage $V_{OUT}$ and the switching signal S2.

The error amplifier 30 is used for amplifying an error between the divided output voltage $V_{OUT}'$ divided by the first resistor R1 and the second resistor R2 and a first reference voltage $V_{REF1}$, and generating a second reference voltage $V_{REF2}$. An output terminal of the error amplifier 30 connects a capacitor C11 and resistor R11 for compensating for phase.

The feedback voltage $V_{FB}$ is the divided output voltage $V_{OUT}'$ overlapping the AC switching signal S2. If the feedback voltage $V_{FB}$ is directly input to the reverse input terminal of the error amplifier 30, vibration of the second reference voltage $V_{REF2}$ will occur due to influence of the switching signal. Thus, in order to obtain a DC component (divided output voltage $V_{OUT}'$) from the feedback voltage $V_{FB}$, ideally, a low pass filter 26 is used to obtain divided output voltage $V_{OUT}'$ from the feedback voltage $V_{FB}$. Therefore, vibration of the second reference voltage $V_{REF2}$ can be prevented.

Figure 4:
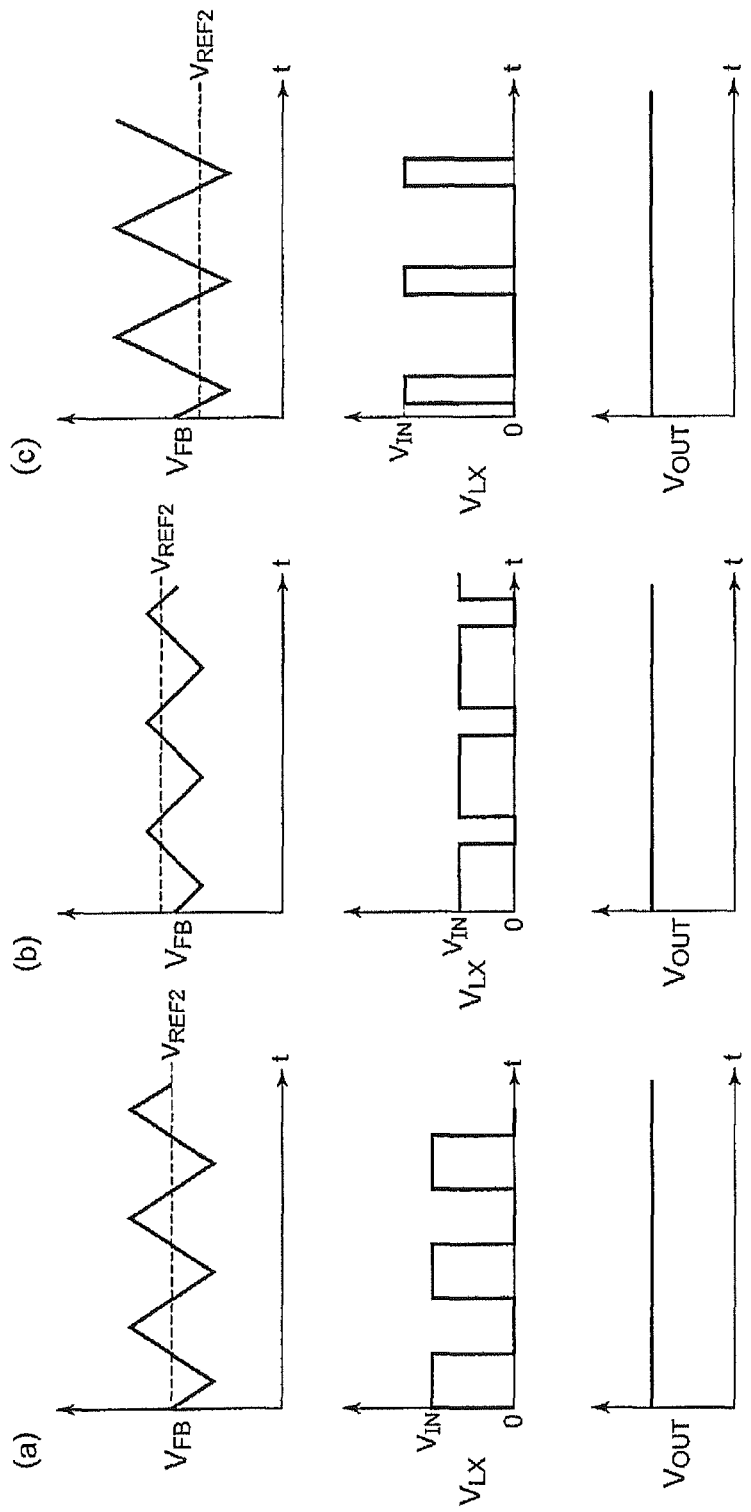
FIGS. 4(a)-4(c) show sequence diagrams of the operation of the switching regulator of FIG. 3.

The above description pertains to the elements of the switching regulator 4. Next, the operation of the switching regulator 4 is described. FIGS. 4(a)-4(c) show sequence diagrams of the operation of the switching regulator 4 of FIG. 3. FIG. 4(a) shows the input voltage $V_{IN}$ at a normal voltage level condition. FIG. 4(b) shows the input voltage $V_{IN}$ at an under voltage level condition lower than a normal voltage level. FIG. 4(c) shows the input voltage $V_{IN}$ at an over voltage level condition higher than a normal voltage level.

Similar to the switching regulator 1004 of FIG. 1, the switching regulator 4 causes the feedback voltage $V_{FB}$ of the first feedback to be close to the second reference voltage $V_{REF2}(V_{REF})$ so as to stabilize the output voltage $V_{OUT}$. Compared with the fixed reference voltage $V_{REF}$ in switching regulator 1004 of FIG. 1, in switching regulator 4 of FIG. 3 the error amplifier 30 as a second feedback circuit is used to adjust the reference voltage $V_{REF2}$ in a control manner to have the divided output voltage $V_{OUT}'$ and the first reference voltage $V_{REF1}$ be identical.

Therefore, even when vibration of the input voltage $V_{IN}$ occurs, the method to eliminate the vibration can be used to adjust the second reference voltage $V_{REF2}$ so as to restrain the vibration of output voltage $V_{OUT}$. That is, the voltage regulation rate can be improved.

Furthermore, using the second feedback circuit and the control manner to have the divided output voltage $V_{OUT}'$ and the first reference voltage $V_{REF1}$ be identical, even when vibration of the load occurs, the vibration of output voltage $V_{OUT}$ can be restrained. That is, the load regulation rate can be improved.

Figure 5:
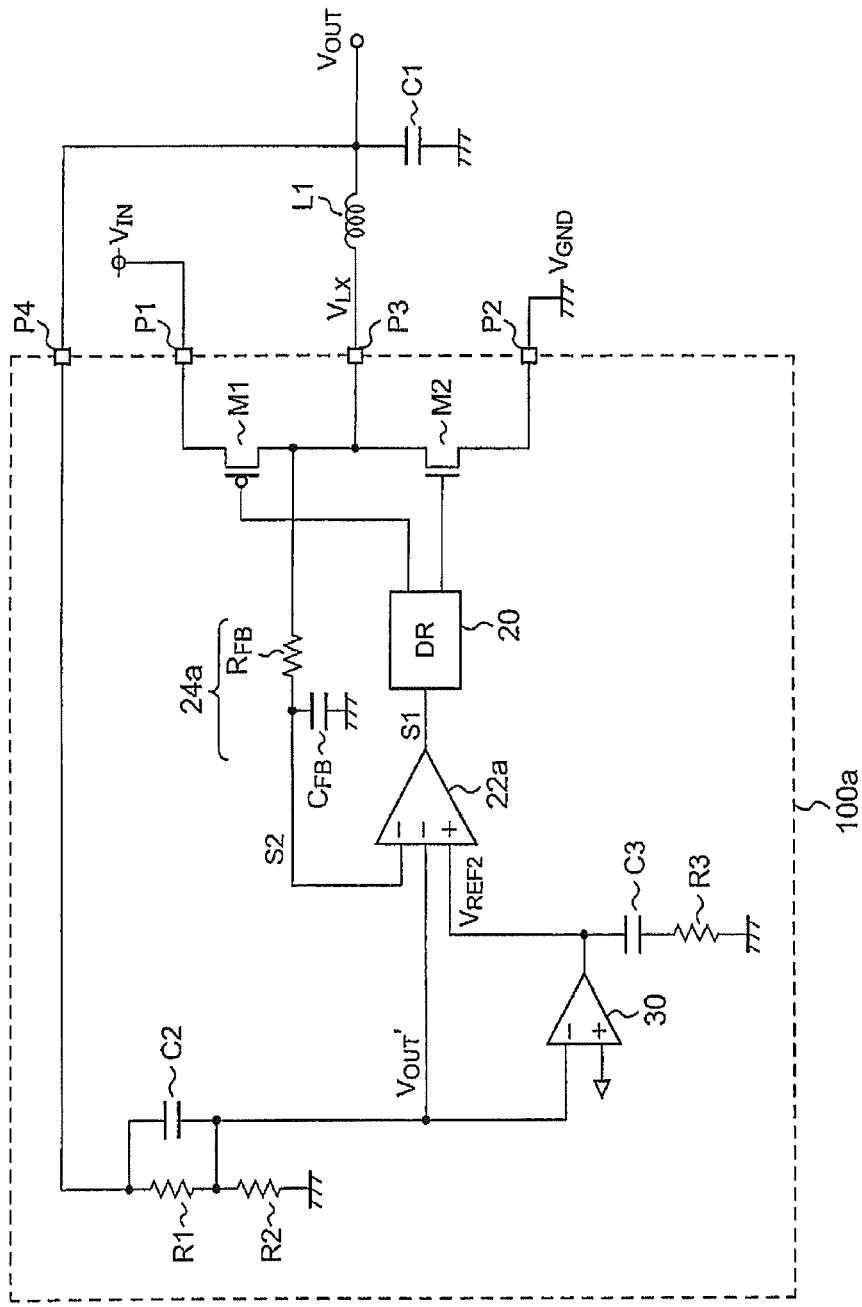
FIG. 5 shows a circuit diagram of another embodiment of the switching regulator in FIG. 3.

FIG. 5 shows a circuit diagram of another embodiment of the switching regulator in FIG. 3. In FIG. 5, the control circuit 100a includes a comparator 22a having three input terminals instead of the comparator having two input terminals in FIG. 3. The comparator 22a includes two reverse input terminals and a non-reverse input terminal. The divided output voltage $V_{OUT}'$ divided by the first resistor R1 and the second resistor R2 is input to one of two reverse input terminals, and the output voltage S2 of the feedback circuit 24a is input to the other of two first polarity input terminals. The feedback circuit 24a of FIG. 5 is an RC filter (resistance capacitance filter) including a resistor $R_{FB}$ and a capacitor $C_{FB}$. The second reference voltage $V_{REF2}$ generated from the error amplifier 30 is input to the non-reverse input terminal of the comparator 22a.

Figure 6:
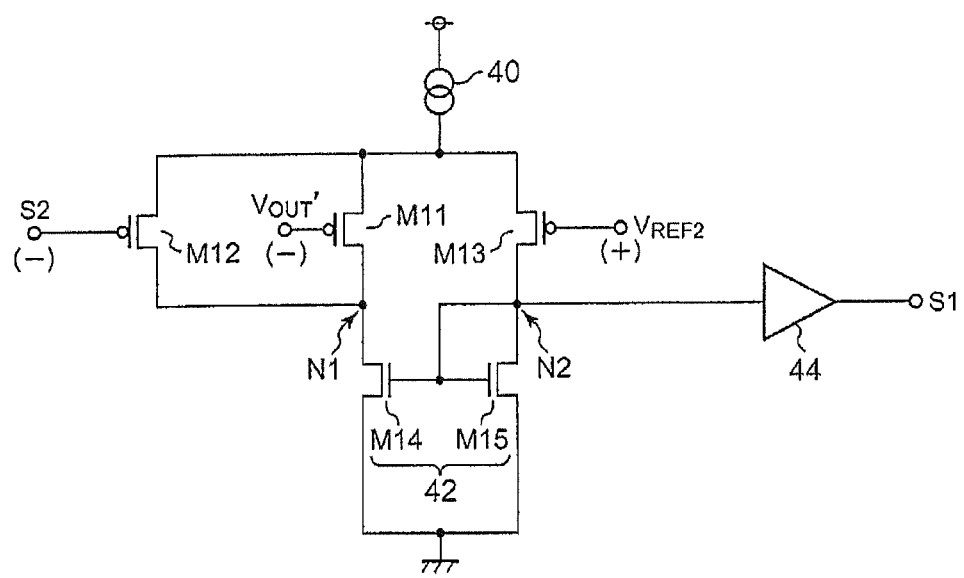
FIG. 6 shows a circuit diagram of an embodiment of the comparator having three input terminals.

FIG. 6 shows a circuit diagram of an embodiment of the comparator 22a having three input terminals. A first input transistor M11 of the comparator 22a includes a control terminal (gate) connecting to one of two reverse input terminals. The gate of a second input transistor M12 connects to the other of two reverse input terminals. The gate of a third input transistor connects to the non-reverse input terminal. Transistors M14 and M15 form a mirror circuit, and act as a load circuit 42 connecting to the first input transistor M11, the second input transistor M12 and the third input transistor M13. A tail current source 40 is used for providing a tail current to the first input transistor M11, the second input transistor M12 and the third input transistor M13. An output section 44 outputs the signal S1 corresponding to the voltage of connecting point N1 (or N2) connecting transistors M11-M13 and the load circuit 42. The output section 44 can utilize conventional techniques.

In comparator 22a, the output voltage $V_{OUT}'$ and the switching signal S2 are converted to current by using the transistors M11 and M12 of the comparator 22a. Then, the currents respectively flowing through the transistors M11 and M12 flow through the transistor M14, thus the output voltage $V_{OUT}'$ can overlap the switching signal S2.

Referring to FIG. 5, the control circuit 100a operates in the same manner as control circuit 100 of FIG. 3. Therefore, the voltage regulation rate and the load regulation rate can be improved.

Second Embodiment

Figure 7:
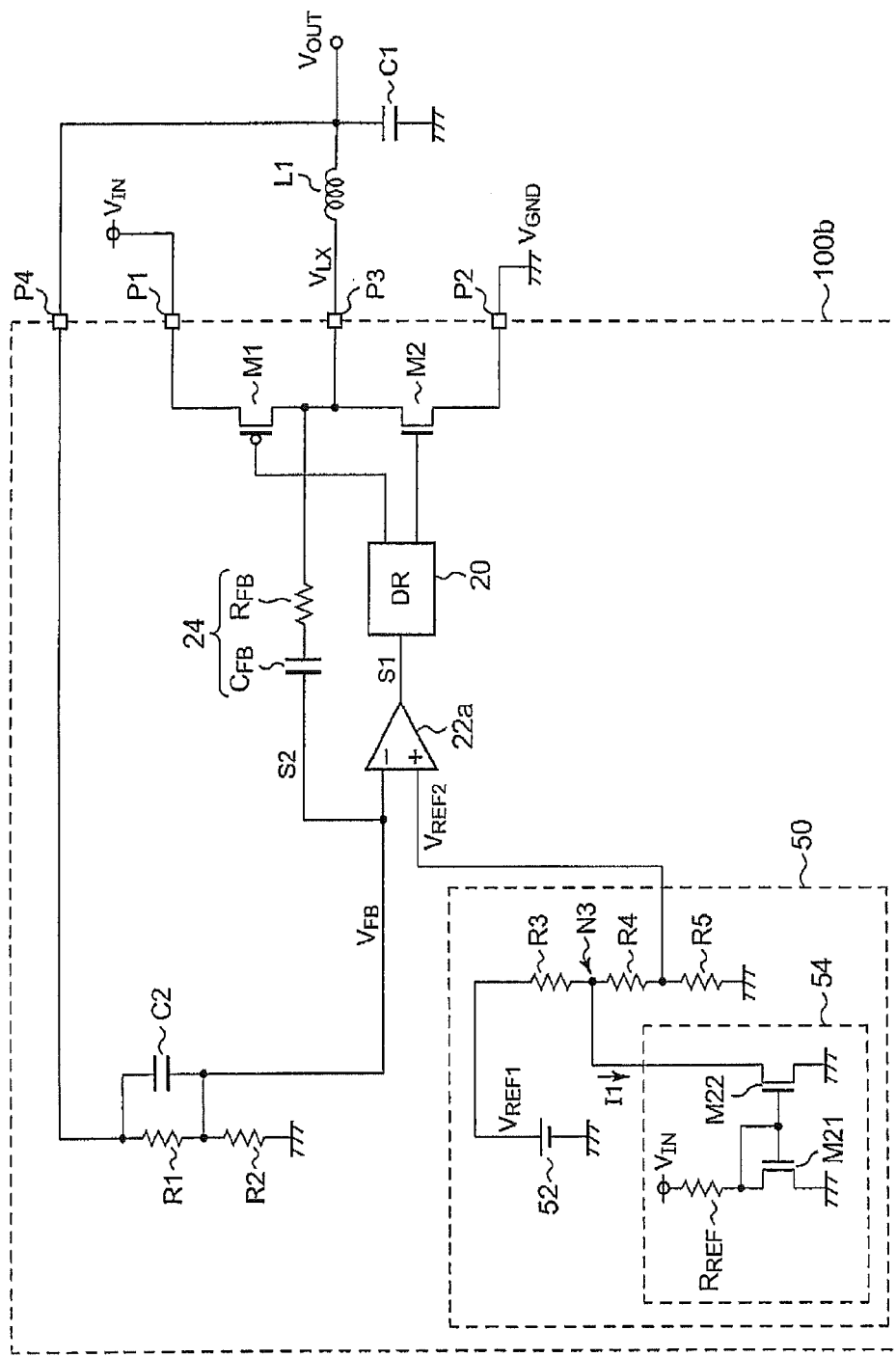
FIG. 7 shows a circuit diagram of the switching regulator according to the second embodiment.

In the first embodiment, the reference voltage $V_{REF2}$ of the comparator 22 is adjusted by using feedback. In the second embodiment, the reference voltage $V_{REF2}$ of the comparator 22 is adjusted by using feedforward. FIG. 7 shows a circuit diagram of the switching regulator 4b according to the second embodiment.

A voltage source 50 is used for generating a reference voltage $V_{REF2}$ to input to a non-reverse input terminal of the comparator, wherein the reference voltage $V_{REF2}$ can be reduced when the input voltage increases $V_{IN}$. Using the feedforward control, the reference voltage $V_{REF2}$ can be controlled by fixing the level of the feedback voltage $V_{FB}$ as shown in FIGS. 4(a)-4(c). Compared with the feedback control, the advantages of the feedforward control are high circuit stability and ease of design. Furthermore, because the error amplifier is not needed, the power consumption of the circuit can be reduced.

The voltage source 50 includes a reference voltage source 52, a third resistor R3, a fourth resistor R4, a fifth resistor R5 and a variable current source 54. The reference voltage source 52 is used for generating a stable first reference voltage $V_{REF1}$. The third resistor R3 and the fourth resistor R4 connect in series and are installed between the first reference voltage $V_{REF1}$ and a ground terminal $V_{GND}$. The variable current source 54 is used for generating a variable current I1 derived from a connecting point N3 connecting the third resistor R3 and the fourth resistor R4, and the variable current can be increased when the input voltage $V_{IN}$ increases.

For example, the variable current source 54 includes a reference resistor $R_{REF}$ and a current mirror circuit M21 and M22. The reference resistor $R_{REF}$ has an end connecting to the input voltage $V_{IN}$. The current mirror circuit M21 and M22 has an input terminal and an output terminal, the input terminal of the current mirror circuit M21 and M22 connects to the other end of the reference resistor $R_{REF}$, the output terminal of the current mirror circuit M21 and M22 connecting to the connecting point N3 connecting the third resistor R3 and the fourth resistor R4. The variable current I1 of the variable current source 54 is expressed as equation (1).

$$I1 = V_{IN} - Vth/R_{REF} \quad (1)$$

Vth is the voltage between gate and source of transistor M21.

Then, the voltage $V_{N3}$ is generated on the connecting point N3.

$$V_{N3} = V_{REF1} - R3 \times I1 = V_{REF1} - R3 \times (V_{IN} - Vth/R_{REF})$$

The voltage source 50 generates a reference voltage $V_{REF2}$ by dividing the voltage $V_{N3}$ using the fourth resistor R4 and the fifth resistor R5. That is, the reference voltage $V_{REF2}$ is expressed as equation (2).

$$V_{REF2} = \{V_{REF1} - R3 \times (V_{IN} - Vth/R_{REF})\} \times R5/(R4+R5) \quad (2)$$

In addition, the voltage source 50 can directly output the voltage $V_{N3}$ as the reference voltage $V_{REF2}$. In this embodiment, the reference voltage $V_{REF2}$ is expressed as equation (2').

$$V_{REF2} = V_{REF1} - R3 \times (V_{IN} - Vth/R_{REF}) \quad (2')$$

That is, in FIG. 7, the voltage source 50 generates the reference voltage $V_{REF2}$ in proportion to $V_{REF1} - R3 \times (V_{IN} - Vth/R_{REF})$. The above equation is normalized to obtain equation (3).

$$V_{REF2} = a \times V_{IN} + b \quad (3)$$

In the above equation, "a" is a negative real number, "b" is a positive real number, and $V_{IN}$ is the input voltage. The parameter "a" and "b" can be optimized by adjusting the value of the resistors. According to the input voltage $V_{IN}$, the optimal reference voltage $V_{REF2}$ can be provided to fix the output voltage $V_{OUT}$. That is, the voltage regulation rate can be improved.

While the invention has been described and illustrated with reference to specific embodiments thereof, these descriptions and illustrations do not limit the invention. It should be understood by those skilled in the art that various changes may be made and equivalents may be substituted without departing from the true spirit and scope of the invention as defined by the appended claims. All such modifications are intended to be within the scope of the claims appended hereto.

What is claimed is:

1. A control circuit for controlling at least one switching transistor of a switching regulator receiving an input voltage and generating an output voltage, comprising:
 a first resistor and a second resistor for dividing the output voltage of the switching regulator;
 a comparator having a first polarity input terminal input a divided output voltage divided by the first resistor and the second resistor;
 a driver for controlling the switching transistor according to an output pulse of the comparator;
 a feedback circuit for outputting a switching signal to the first polarity input terminal of the comparator according to the output pulse, the switching signal for switching two voltage levels between the input voltage and a fixed voltage; and
 an error amplifier for amplifying an error between the divided output voltage divided by the first resistor and the second resistor and a first reference voltage and generating a second reference voltage to output to a second polarity input terminal of the comparator.

2. The control circuit as claimed in claim 1, further comprising a low pass filter connecting to the error amplifier, wherein a DC component from the voltage of the first polarity input terminal of the comparator is output to the low pass filter.

3. The control circuit as claimed in claim 1, wherein the comparator has three input terminals comprising two first polarity input terminals and one second polarity input terminal, the divided output voltage divided by the first resistor and the second resistor is input to one of two first polarity input terminals, and an output voltage of the feedback circuit is input to the other of two first polarity input terminals.

4. The control circuit as claimed in claim 3, the comparator having three input terminals, comprising:
 a first input transistor having a control terminal connecting to one of two first polarity input terminals;
 a second input transistor having a control terminal connecting to the other of two first polarity input terminals;
 a third input transistor having a control terminal connecting to the second polarity input terminal;
 a load circuit connecting to the first input transistor, the second input transistor and the third input transistor; and
 a tail current source for providing a tail current to the first input transistor, the second input transistor and the third input transistor.

5. A switching regulator, comprising the control circuit as claimed in claim 1.

6. An electronic equipment, comprising the switching regulator to as claimed in claim 5.

7. A control circuit for controlling at least one switching transistor of a switching regulator receiving an input voltage and generating an output voltage, comprising:
 a first resistor and a second resistor for dividing the output voltage of the switching regulator;
 a comparator having a first input terminal input a divided output voltage divided by the first resistor and the second resistor;
 a voltage source for generating a reference voltage to input to a second input terminal of the comparator, wherein the reference voltage can be reduced when the input voltage increases;
 a driver for controlling the switching transistor according to an output pulse of the comparator; and
 a feedback circuit for outputting a switching signal to the first input terminal of the comparator according to the output pulse, the switching signal for switching two voltage levels between the input voltage and a fixed voltage.

8. The control circuit as claimed in claim 7, wherein the voltage source provides the reference voltage ($V_{REF2}$) to the comparator according to an equation of $V_{REF2}=a \times V_{IN}+b$, wherein "a" is a negative real number, "b" is a positive real number, and $V_{IN}$ is the input voltage.

9. The control circuit as claimed in claim 7, wherein the voltage source comprises:
 a reference voltage source for generating a stable first reference voltage;
 a third resistor and a fourth resistor connecting in series and installed between the first reference voltage and a ground terminal; and
 a variable current source for generating a variable current derived from a connecting point connecting the third resistor and the fourth resistor, wherein the variable current can be increased when the input voltage increases;
 wherein a corresponding reference voltage corresponding to the third resistor and the fourth resistor is input to the comparator.

10. The control circuit as claimed in claim 9, wherein the variable current source comprises:
 a reference resistor having an end connecting to the input voltage; and
 a current mirror circuit having an input terminal and an output terminal, the input terminal connecting to the other end of the reference resistor, the output terminal connecting to the connecting point connecting the third resistor and the fourth resistor.

* * * * *